United States Patent
Holcomb et al.

(10) Patent No.: US 8,919,129 B2
(45) Date of Patent: Dec. 30, 2014

(54) LOW FLOW CORRECTION FOR GAS TURBINE ENGINE FUEL VALVE CHARACTERISTICS

(71) Applicant: Solar Turbines Incorporated, San Diego, CA (US)

(72) Inventors: Chad M. Holcomb, San Diego, CA (US); Saliha Kenyon Lacoursiere, San Diego, CA (US); Roy Thomas Collins, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 0 days.

(21) Appl. No.: 13/852,797

(22) Filed: Mar. 28, 2013

(65) Prior Publication Data

US 2014/0290262 A1    Oct. 2, 2014

(51) Int. Cl.
  *F02C 1/00*    (2006.01)
  *F02C 9/32*    (2006.01)
(52) U.S. Cl.
  CPC .................................... *F02C 9/32* (2013.01)
  USPC ........................................ 60/772; 60/39.281
(58) Field of Classification Search
  CPC .............. F02C 9/26; F02C 9/28; F02C 7/232; F02C 9/263
  USPC ........................................ 60/39.281, 734, 772
  See application file for complete search history.

(56) References Cited

U.S. PATENT DOCUMENTS

| | | | |
|---|---|---|---|
| 3,371,698 A | 3/1968 | Hitzelberger et al. | |
| 6,148,601 A * | 11/2000 | Jones et al. | 60/773 |
| 6,836,086 B1 | 12/2004 | Goldberg et al. | |
| 7,481,061 B2 | 1/2009 | Gadde et al. | |
| 7,610,746 B2 | 11/2009 | Fujii et al. | |
| 7,805,922 B2 | 10/2010 | Bland | |
| 8,015,791 B2 | 9/2011 | Finkbeiner et al. | |
| 8,490,379 B2 * | 7/2013 | Nomura et al. | 60/39.281 |
| 8,712,665 B2 * | 4/2014 | Szepek et al. | 701/100 |
| 2003/0093184 A1* | 5/2003 | Tanaka | 700/289 |
| 2010/0280731 A1 | 11/2010 | Snider | |
| 2011/0302927 A1 | 12/2011 | Ajami et al. | |

* cited by examiner

*Primary Examiner* — Phutthiwat Wongwian
(74) *Attorney, Agent, or Firm* — Procopio, Cory, Hargreaves & Savitch LLP

(57) ABSTRACT

A method for controlling a gas turbine engine fuel control valve during low flow conditions includes positioning the fuel control valve in an operating position. The method also includes determining a fuel control valve flow sensor flow rate while in the operating position and determining a corrected effective flow area ("Cda") of the fuel control valve. The method further includes generating Cda versus command data with the corrected Cda and the operating position and inserting the generated Cda versus command data into the nominal Cda versus command data set when nominal Cda versus command data is not known at the operating position.

14 Claims, 3 Drawing Sheets ically oriented differently from an axial direction. The control module then sends a command signal to the fuel control valve to position the fuel control valve in the operating position. The effective flow area compensation module is configured to receive the flow sensor flow rate and the command signal, generate effective flow area versus command data when the nominal effective flow area versus command data is not available, and determine a correction for the nominal effective flow area versus command data when the nominal effective flow area versus command data is available.

LOW FLOW CORRECTION FOR GAS TURBINE ENGINE FUEL VALVE CHARACTERISTICS

TECHNICAL FIELD

The present disclosure generally pertains to gas turbine engines, and is more particularly directed toward a low flow correction or compensation for gas turbine engine fuel valve characteristics using a flow measurement device to compensate for operating a fuel valve outside of the calibrated range.

BACKGROUND

Gas turbine engines include compressor, combustor, and turbine sections. A fuel system delivers fuel to the combustor fuel nozzles. The gas fuel flow may be approximated or inferred by the fuel system during operation of the gas turbine engine.

U.S. patent publication No. 2010/0280731 to D. Snider discloses systems and methods for controlling fuel flow to a turbine component. One or more parameters associated with a fuel flow to a turbine component may be monitored. The fuel flow may be modeled based at least in part on the one or more monitored parameters. The fuel flow may be adjusted to a target fuel flow based at least in part on the modeling of the fuel flow.

The present disclosure is directed toward overcoming one or more of the problems discovered by the inventors.

SUMMARY OF THE DISCLOSURE

A method for controlling a gas turbine engine fuel control valve during low flow conditions is disclosed. The method includes modifying a nominal effective flow area versus command data set to a corrected effective flow area versus command data set, including positioning the fuel control valve in an operating position. Modifying the nominal effective flow area versus command data set also includes determining a flow rate with a flow sensor when the fuel control valve is in the operating position and determining a corrected effective flow area of the fuel control valve in the operating position. Modifying the nominal effective flow area versus command data set further includes generating effective flow area versus command data based on the corrected effective flow area of the fuel control valve and the operating position of the fuel control valve, and inserting the generated effective flow area versus command data into the nominal effective flow area versus command data set when nominal effective flow area versus command data within the nominal effective flow area versus command data set is not known at the operating position. The method also includes using the corrected effective flow area versus command data set to position the fuel control valve.

A control system of a gas turbine engine fuel system with a fuel control valve and a flow sensor downstream of the fuel control valve is also disclosed. The control system includes a flow module, a fuel control module, and an effective flow area compensation module. The flow module is configured to receive signals from a flow sensor and to determine a flow sensor flow rate. The fuel control module is configured to determine an operating position of the fuel control valve. The fuel control module determines the operating position of the fuel control valve based on the flow sensor flow rate when nominal effective flow area versus command data is not available. The fuel control module determines the operating position of the fuel control valve based on the nominal effective

DETAILED DESCRIPTION

The systems and methods disclosed herein include a method for controlling a gas turbine engine fuel system. In embodiments, the gas turbine engine fuel system relies on the nominal effective flow area versus command characteristic of the control valves to determine the control valve flow rate. The nominal effective flow area versus command characteristic of the control valve may not be available at low flow rates. A flow measurement device or flow sensor may be used to measure the fuel flow rate and generate the unknown effective flow area versus command characteristic or may be used directly by the control system.

Figure 1:
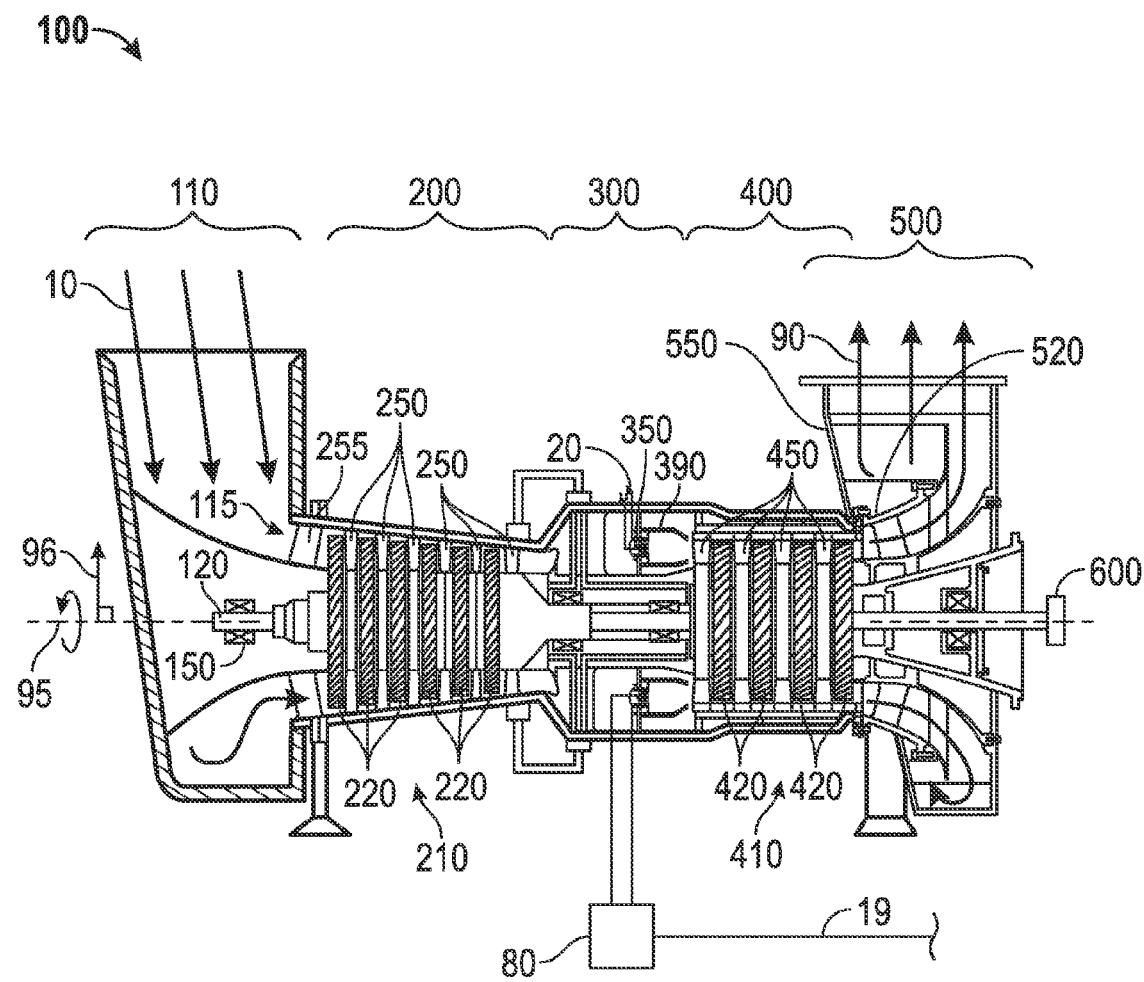
FIG. 1 is a schematic illustration of an exemplary gas turbine engine and fuel system.

FIG. 1 is a schematic illustration of an exemplary gas turbine engine and fuel system. Some of the surfaces and components have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with other engine concentric components. All references to radial, axial, and circumferential directions and measures refer to center axis 95, unless specified otherwise. The terms such as "inner" and "outer" generally indicate a lesser or greater radial distance from the center axis 95. A radial 96 may be in any direction perpendicular and radiating outward from center axis 95.

A gas turbine engine 100 includes an inlet 110, a shaft 120, a gas producer or "compressor" section 200, a combustor 300, a turbine section 400, an exhaust 500, and a power output coupling 600. The gas turbine engine 100 may have a single shaft or a multiple shaft configuration.

The compressor section 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. A compressor stage includes a compressor disk assembly 220 paired with the adjacent stators 250 that follow the compressor disk assembly 220. Compressor section 200 includes multiple compressor stages. Inlet guide vanes 255 axially precede the fixed compressor stages. The inlet guide vanes 255 may be variable guide vanes.

The combustor 300 includes one or more fuel injectors 350 and includes one or more combustion chambers 390. A fuel system 80 delivers pressurized fuel to fuel injectors 350. Fuel system 80 receives pressurized fuel from fuel supply line 19, which supplies pressurized liquid or gas fuel from a fuel source (not shown).

The turbine section 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine section 400 includes multiple turbine stages.

The exhaust 500 includes an exhaust diffuser 520 and an exhaust collector 550.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
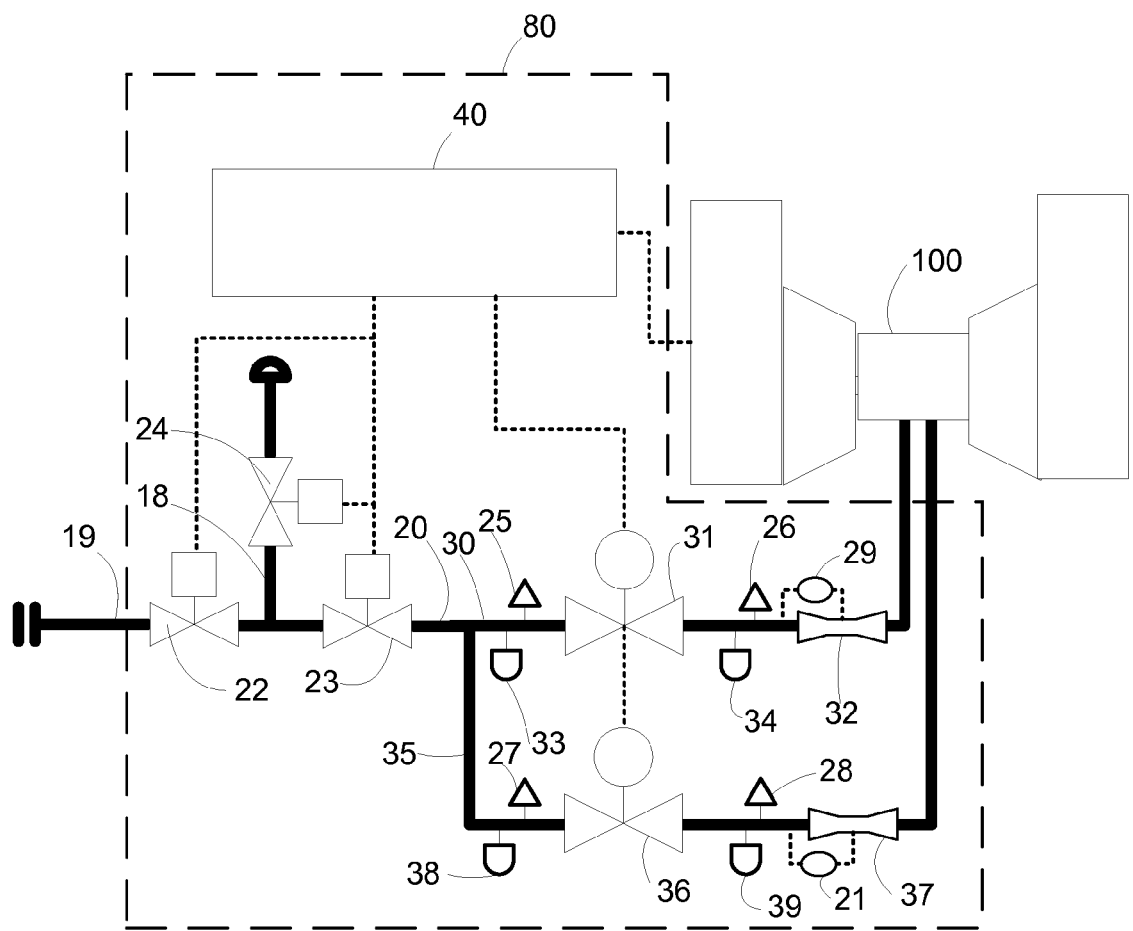
FIG. 2 is a schematic diagram of the fuel system of FIG. 1.

FIG. 2 is a schematic diagram of the fuel system 80 of FIG. 1 and the gas turbine engine 100. Pressurized gas fuel from fuel supply 19 travels along fuel line 20. Fuel line 20 may include block valves 22 and 23, with block valve 22 upstream of block valve 23. Vent line 18 may split or tee off from fuel line 20 between block valves 22 and 23. Vent line 18 may include vent valve 24.

Fuel line 20 may split into multiple fuel lines such as a primary fuel line 30 and a secondary fuel line 35. The split of fuel line 20 may be accomplished by fittings, manifolds, etc. In the embodiment shown in FIG. 2, fuel line 20 splits into primary fuel line 30 and secondary fuel line 35 after block valve 23.

Each of primary fuel line 30 and secondary fuel line 35 include one or more gas fuel control valves ("control valves") and may include a flow sensor. Any number of control valves may be included in fuel system 80 in both series and parallel configurations. Any type of flow sensor or flow measurement device may be used. In the embodiment illustrated, the flow sensors are venturis with differential pressure sensors. In the embodiment shown, primary fuel line 30 includes primary control valve 31 and primary venturi 32, and secondary fuel line 35 includes secondary control valve 36 and secondary venturi 37. In some embodiments, a fuel line may include a primary control valve and a secondary control valve in series. Each fuel delivery line may also include sensing elements on either the upstream or downstream side of the fuel control valves. Exemplar sensors include pressure, temperature, and flow sensors. The downstream pressure and temperature sensors will be upstream of the flow sensor.

In the embodiment shown in FIG. 2, primary fuel line 30 includes upstream pressure sensor 33, downstream pressure sensor 34, upstream temperature sensor 25, and downstream temperature sensor 26; and secondary fuel line 35 includes upstream pressure sensor 38, downstream pressure sensor 39, upstream temperature sensor 27, and downstream temperature sensor 28. In some embodiments, primary fuel line 30 splits into primary fuel delivery lines after primary venturi 32, and secondary fuel line 35 splits into secondary fuel delivery lines after secondary venturi 37. Each split may be accomplished by fittings, manifolds, etc. Each fuel injector 350 (shown in FIG. 1) may be connected to a primary fuel delivery line and to a secondary fuel delivery line. Primary fuel delivery line may include one or more valves, and may connect to one or more fuel injector 350 ports. Similarly, secondary fuel delivery line may include one or more valves, and may connect to one or more fuel injector 350 ports. Other fuel delivery lines and configurations may also be used. In some embodiments, the secondary fuel line 35 is a pilot fuel line.

Fuel system 80 also includes control system 40. Control system 40 may include an electronic control circuit having a central processing unit ("CPU"), such as a processor, or micro controller. Alternatively, control system 40 may include programmable logic controllers or field-programmable gate arrays. Control system 40 may also include memory for storing computer executable instructions, which may be executed by the CPU. The memory may further store data related to controlling the fuel pressure and flow including the nominal effective flow area versus command data of the control valves. Control system 40 also includes inputs and outputs to receive sensor signals and send control signals.

INDUSTRIAL APPLICABILITY

Gas turbine engines may be used for industrial applications such as the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor section 200. In the compressor section 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once air 10 leaves the compressor section 200, it enters the diffuser and then combustor 300 where fuel is added. Compressed air 10 and fuel are injected into the combustion chamber 390 via injector 350 and combusted. Energy is extracted from the combustion reaction via the turbine section 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Referring to FIG. 2, during operation of gas turbine engine 100, control system 40 calculates the required supply pressure at the control valve to maintain turbine speed and load.

Control system 40 has information regarding the fuel demand, fuel characteristics, fuel pressures upstream of the control valve(s) and downstream of the control valve(s), and the control valve characteristics, such as the nominal effective flow area versus command data. Control system 40 may also have information about the required flows and pressures into the gas turbine engine to maintain combustion stability or to determine a set point for a desired increase in load. Control system 40 determines the control valve(s) position and may change the position and effective flow area of the control valve(s) by communicating or transmitting a control signal or command to the control valve(s).

In the embodiment shown in FIG. 2, control system 40 communicates control signals to primary control valve 31 and secondary control valve 36. Using the available information, control system 40 can limit and control fuel delivery.

Figure 3:
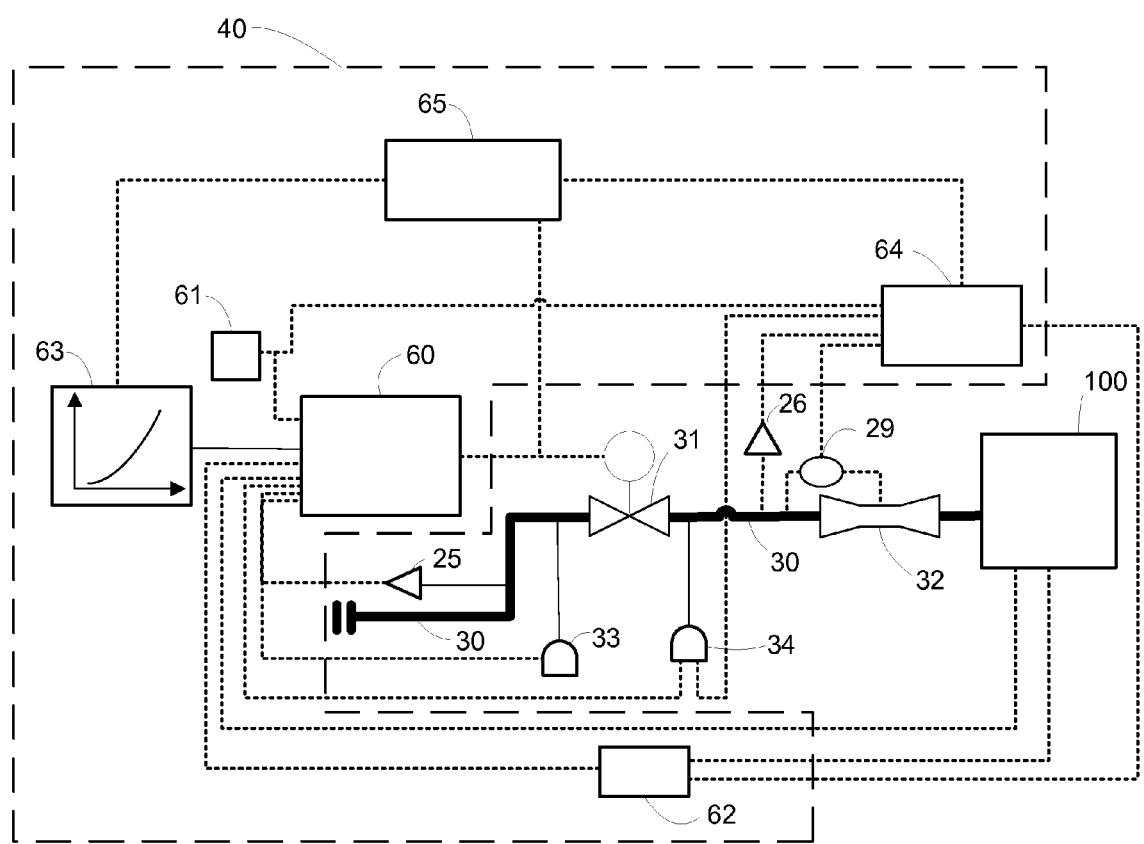
FIG. 3 is a schematic diagram for the nominal effective flow area compensation of a control valve of the fuel system of FIG. 2.

FIG. 3 is a schematic diagram for the nominal effective flow area ("Cda") compensation of a single control valve of the fuel system of FIG. 2 for a single flow path. While FIG. 3 illustrates the nominal Cda compensation along primary flow path 30, the nominal Cda compensation disclosed is not limited to use with primary flow path 30 and may be used in conjunction with other fuel lines such as secondary flow path 35 (shown in FIG. 2). All discussion of primary control valve 31 may apply to secondary control valve 36 and other fuel control valves.

In embodiments, the Cda at a given position of primary control valve 31 is the flow area of primary control valve 31 times the coefficient of discharge, the true or theoretical flow of primary control valve 31; the nominal Cda at a given position of primary control valve 31 is the Cda provided by the manufacturer, with the collection of nominal Cdas provided by the manufacturer being the valve characteristic of primary control valve 31; a Cda at a given position paired with the command to position primary control valve 31 in that given position is the Cda versus command data; and the valve characteristic paired with the corresponding commands is the nominal Cda versus command data set 63.

The control system 40 may include a fuel control module 60, a flow module 64, a Cda compensation module 65, and a maximum fuel limit module 62. The control system 40 may also include a nominal Cda versus command data set 63 of primary control valve 31 and fuel characteristics 61 of the fuel being used by the gas turbine engine 100. The nominal Cda versus command data set 63 includes the valve characteristic of primary control valve 31.

In the embodiment shown in FIG. 3, the fuel control module 60 receives information such as the fuel characteristics 61, feedback from gas turbine engine 100, including data from the maximum fuel limit module 62, the upstream pressure from upstream pressure sensor 33, the downstream pressure from downstream pressure sensor 34, the upstream temperature from upstream temperature sensor 25, and the Cda versus command data set 63. The fuel characteristics 61 may include the Boltzmann constant, the lower heating value, and the specific gravity of the fuel. The feedback may include the speed of the gas producer and the speed of the power turbine (in a dual shaft configuration). The fuel control module 60 uses this information to calculate or determine a fuel flow rate ("control valve flow"), such as a volumetric fuel flow rate, to determine the fuel flow rate to the fuel injectors 350 (shown in FIG. 1) and to determine an operating position of primary control valve 31.

The fuel control module 60 then sends a command signal to position primary control valve 31 into the operating position, which may include positioning primary control valve 31. In one embodiment, fuel control module 60 is performed by a programmable logic controller ("PLC"). Direct measurement of the fuel flow rate to the fuel injectors 350 may reduce the speed of response of the system, which is not always desirable.

The actual Cda of primary control valve 31 may be different than the nominal Cda of primary control valve 31 due to manufacturing defects, contamination build up, corrosion, mechanical component degradation, and other valve faults. The difference between actual Cda and nominal Cda can affect the relationship between Cda and command. The nominal Cda may be provided by the manufacturer or determined prior to putting primary control valve 31 into service.

A flow sensor is used to correct or calibrate the Cda versus command data set 63 of primary control valve 31. Flow module 64 uses fuel characteristics 61 and the data collected by the flow sensor to determine a flow sensor flow rate, the actual fuel flow rate to the fuel injectors 350 (shown in FIG. 1). In the embodiment illustrated, flow module 64 uses differential pressure 29 measured between the inlet and the throat of primary venturi 32, the pressure from downstream pressure sensor 34, and the temperature from downstream temperature sensor 26 to calculate or determine the flow sensor flow rate. The flow sensor flow rate may be a volumetric flow rate or a mass flow rate. Flow module 64 determines the flow sensor flow rate relative to the operating position of primary control valve 31 or relative to the command signal. Flow module 64 measures the flow sensor flow rate when primary control valve 31 is in the determined operating position.

The upstream pressure sensor 33 may send an upstream pressure signal, the downstream pressure sensor 34 may send a downstream pressure signal, the upstream temperature sensor 25 may send an upstream temperature signal, the downstream temperature sensor 26 may send a downstream temperature signal, and the flow sensor may send a flow sensor signal. The fuel control module 60, the flow module 64, the Cda compensation module 65, and the maximum fuel limit module 62 may be configured to receive the upstream pressure signal, the downstream pressure signal, the upstream temperature signal, the downstream temperature signal, and the flow meter signal.

The flow module 64 sends the flow sensor flow rate to the Cda compensation module 65. The Cda compensation module 65 uses the flow sensor flow rate to determine or estimate the actual Cda of primary control valve 31 relative to the command signal and operating position of primary control valve 31. The same algorithm used by fuel control module 60 to determine the control valve flow may be inverted and used by the Cda compensation module 65 to determine the corrected or actual Cda based off of the flow sensor flow rate. The Cda compensation module 65 may also compare the control valve flow to the flow sensor flow rate to determine the corrected Cda. The Cda compensation module 65 may update, modify, correct, or replace Cda versus command data in the nominal Cda versus command data set 63 to calibrate or recalibrate primary control valve 31, which may improve the accuracy of fuel control module 60.

The Cda compensation module 65 can filter the input and output signals to obtain the optimal performance. The Cda compensation module 65 may include a compensation filter. Filtering the Cda compensation module 65 may prevent or reduce any interference that the Cda compensation module 65 may cause and may ensure that the correction is smooth to ensure fuel control stability.

The nominal valve effective area data, such as Cda versus command data, may not be known or may be uncertain at low flow conditions of the gas turbine engine fuel system 80 such as during ignition and at low fuel ratios in multi valve configurations. Manufacturers of the control valves may not provide or have the nominal low flow control valve characteristics such as the nominal Cda versus command data set 63. The Cda compensation module 65 may be used to correct the nominal low flow Cda versus command data set 63 that may be used to control and calibrate primary control valve 31 at low flow conditions.

Controlling primary control valve 31 at low flow conditions includes modifying the nominal Cda versus command data set 63 to a corrected Cda versus command data set and using the corrected Cda versus command data set to control primary control valve 31. Modifying the nominal Cda versus command data set 63 includes positioning the fuel control valve in an operating position, which may be based on a flow sensor flow rate measured downstream of primary control valve 31. Modifying the nominal Cda versus command data set 63 also includes determining the flow sensor flow rate when primary control valve 31 is in the operating position and determining a corrected Cda of primary control valve 31 in the operating position using the flow sensor flow rate of primary control valve 31 in the operating position. Modifying the nominal Cda versus command data set 63 further includes generating Cda versus command data based on the corrected Cda of primary control valve 31 and the operating position, and inserting the generated Cda versus command data into the nominal Cda versus command data set 63 when the Cda versus command data is not known. Modifying the nominal Cda versus command data set to a corrected Cda versus command data set may also include replacing the nominal Cda versus command data of the nominal Cda versus command data set 63 for the operating position when the nominal Cda versus command data is known. Using the corrected Cda versus command data set includes positioning primary control valve based on the corrected Cda versus command data set.

Modifying the nominal Cda versus command data set 63 may be performed on a continuous loop during an operating cycle of gas turbine engine 100. In embodiments, the continuous loop occurs by repeating each portion or sub-element of modifying the nominal Cda versus command data set 63 in order. In other embodiments the continuous loop occurs by repeating each portion or sub-element in order with multiple loops occurring simultaneously.

The Cda compensation module 65 may be used to calibrate or determine the nominal or corrected low flow Cda versus command data during unfired operation of the gas turbine engine 100, such as during the engine and exhaust purge sequence of the gas turbine engine 100 start-up when the engine is being rotated using an auxiliary start system, or during other low flow operations of the gas turbine engine 100, such as while running on liquid fuel or in the ratio control of multiple fuel manifold systems.

The Cda compensation module 65 may also be used to calibrate or determine the nominal low flow Cda versus command data for primary control valve 31 prior to installing primary control valve 31 into the fuel system 80 of gas turbine engine 100. Primary control valve 31 may be put into a test or calibration system similar to fuel system 80 that includes control system 40 to determine the nominal low flow Cda versus command data. Primary control valve 31 would be installed into the fuel system 80 of gas turbine engine 100 after the nominal low flow Cda versus command data is determined. The nominal low flow Cda versus command data would be added to the nominal Cda versus command data set 63.

In some embodiments, the nominal Cda versus command data used at low flow conditions prior to calibration may be assumed. In one embodiment, a linear relationship extending from the lowest known Cda versus command data 63 is used. In another embodiment, the nominal Cda versus command data is extrapolated from the provided Cda versus command data 63. In yet another embodiment, the nominal Cda versus command data may be extracted from the Cda versus command data of a similar control valve that has already been calibrated at a low flow condition.

Referring to FIGS. 2 and 3, low flow conditions may also occur for secondary control valve 36. All discussion of primary control valve 31 with regard to Cda versus command data 63 may apply to secondary control valve 36 and other secondary control valves. The flow sensor flow rates measured at primary venturi 32 using differential pressure 29 and at secondary venturi 37 using secondary differential pressure 21 may be used by fuel control module 60 to control the ratio of fuel flow between primary fuel line 30 and secondary fuel line 35. In one embodiment, the operating position of secondary control valve 36 is determined by the ratio between the primary fuel line fuel flow measured by a flow sensor such as primary venturi 32 and the secondary fuel line 35 fuel flow measured by a flow sensor such as secondary venturi 37.

The flow sensor flow rate may also be used to replace the control valve flow at low commands and flow conditions. In one embodiment, the fuel control module 60 always uses the flow sensor flow rate in place of the control valve flow during low flow conditions such as at start-up of the gas turbine engine 100, for a pilot fuel line, or when the fuel flow is below a configured minimum or predetermined minimum set point of the gas turbine engine 100. In another embodiment, the nominal low flow Cda versus command data is not assumed and the flow sensor flow rate replaces the control valve flow at low flow conditions in the fuel control module 60 until the Cda compensation module 65 determines, generates, or calibrates the corrected Cda versus command data at low flow conditions. The determined, generated, or calibrated flow would then be used by the fuel control module 60 to control the gas turbine engine 100 at low flow conditions. After calibration of the Cda versus command data at low flow conditions, the Cda compensation module 65 may continue to operate.

The maximum fuel limit module 62 may determine whether the gas turbine engine has exceeded the maximum fuel limit of the gas turbine engine 100 by comparing the flow sensor flow to the maximum fuel schedule. The maximum fuel limit module 62 may clamp the fuel demand at the maximum fuel limit.

Those of ordinary skill in the art will appreciate that the various illustrative logical blocks, modules, controllers, units, and algorithms described in connection with the embodiments disclosed herein can often be implemented as electronic hardware, computer software, or combinations of both. To clearly illustrate this interchangeability of hardware and software, various illustrative components, units, blocks, modules, and operations have been described above generally in terms of their functionality. Whether such functionality is implemented as hardware or software depends upon the particular system and design constraints imposed on the overall system. Persons of ordinary skill in the art can implement the described functionality in varying ways for each particular system, but such implementation decisions should not be interpreted as causing a departure from the scope of the invention. In addition, the grouping of functions within a unit, module, block or operation is for ease of description. Specific functions or operations can be moved from one unit, module or block without departing from the invention. Electronic content may include, for example, but is not limited to, data and/or applications which may be accessed through the system or systems.

The various illustrative logical blocks, units, operations and modules described in connection with the example embodiments disclosed herein, may be implemented or performed with, for example, but not limited to, a processor, such as a general purpose processor, a digital signal processor ("DSP"), an application-specific integrated circuit ("ASIC"), a field programmable gate array ("FPGA") or other programmable logic devices, such as a PLC, discrete gate or transistor logic, discrete hardware components, or any combination thereof designed to perform the functions described herein. A general-purpose processor may be, for example, but not limited to, a microprocessor, but in the alternative, the processor may be any processor, controller, or microcontroller. A processor may also be implemented as a combination of computing devices, for example, but not limited to, a combination of a DSP and a microprocessor, a plurality of microprocessors, one or more microprocessors in conjunction with a DSP core, or any other such configuration.

The operations of a method or algorithm and the processes of a block or module described in connection with the example embodiments disclosed herein may be embodied directly in hardware, in a software module (or unit) executed by a processor, or in a combination of the two. A software module may reside in, for example, but not limited to, random access memory ("RAM"), flash memory, read-only memory ("ROM"), erasable programmable read only memory (EPROM), electrically erasable programmable read only memory ("EEPROM"), registers, hard disk, a removable disk, a compact disk ("CD-ROM"), or any other form of machine or non-transitory computer readable storage medium. An exemplary storage medium may be coupled to the processor such that the processor can read information from, and write information to, the storage medium. In the alternative, the storage medium may be integral to the processor. The processor and the storage medium may reside in an ASIC.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular gas turbine engine fuel system, it will be appreciated that the fuel system in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for controlling a gas turbine engine fuel control valve during low flow conditions, the method comprising:
    modifying a nominal effective flow area versus command data set to a corrected effective flow area versus command data set of the fuel control valve including
        positioning the fuel control valve in an operating position,
        determining a flow rate with a flow sensor when the fuel control valve is in the operating position,
        determining a corrected effective flow area of the fuel control valve in the operating position,
        generating effective flow area versus command data based on the corrected effective flow area of the fuel control valve and the operating position of the fuel control valve, and
        inserting the generated effective flow area versus command data into the nominal effective flow area versus command data set when nominal effective flow area versus command data within the nominal effective flow area versus command data set is not known at the operating position; and
    using the corrected effective flow area versus command data set to position the fuel control valve.

2. The method of claim 1, further comprising:
    replacing the nominal effective flow area versus command data with the generated effective flow area versus command data when the nominal effective flow area versus command data is known at the operating position.

3. The method of claim 1, determining the flow rate with the flow sensor includes measuring a differential pressure between an inlet and a throat of a venturi, an inlet pressure of the venturi, and an inlet temperature of the venturi.

4. The method of claim 1, wherein using the corrected effective flow area versus command data set to position the fuel control valve includes determining a fuel control valve flow rate without a flow sensor.

5. The method of claim 4, wherein determining the fuel control valve flow rate without a flow sensor includes measuring an upstream fuel pressure with a pressure sensor, measuring an upstream fuel temperature with a temperature sensor, and measuring a downstream fuel pressure with a pressure sensor.

6. The method of claim 1, wherein the fuel control valve is a secondary fuel control valve.

7. The method of claim 1, wherein positioning the fuel control valve in an operating position includes sending a command to the fuel control valve and generating the effective flow area versus command data is based on the command sent to the fuel control valve.

8. The method of claim 1, further comprising:
    comparing the flow sensor flow rate to a maximum fuel schedule and clamping a fuel demand at the maximum fuel schedule.

9. A method for controlling a gas turbine engine fuel system having a fuel control valve, a flow sensor downstream of the fuel control valve, and a fuel, the method comprising:
    positioning the fuel control valve in an operating position including
        determining the operating position of the fuel control valve based on a flow sensor flow rate when the fuel flow is below configured minimum set point of the gas turbine engine,
        determining the operating position of the fuel control valve based on a nominal effective flow area versus command data set when the fuel flow is above the configured minimum set point of the gas turbine engine, and
        sending a command signal to the fuel control valve;
    determining a flow sensor flow rate with the flow sensor when the fuel control valve is in the operating position;
    correcting the nominal effective flow area versus command data set, including
        determining a corrected effective flow area of the fuel control valve relative to where the fuel control valve is positioned based on the flow sensor flow rate and the position of the fuel control valve, and replacing the effective flow area in the nominal effective flow area versus command data set with the corrected effective flow area.

10. The method of claim 9, wherein determining a flow sensor flow rate includes measuring a differential pressure between an inlet and a throat of a venturi.

11. The method of claim 9, further comprising:
positioning a secondary fuel control valve in a secondary operating position including
determining the secondary operating position based on a secondary flow sensor flow rate when the secondary fuel flow is below a configured minimum set point of the gas turbine engine,
determining the secondary operating position based on a secondary nominal effective flow area versus command data set when the secondary fuel flow is above the minimum set point of the gas turbine engine, and
sending a secondary command signal to the secondary fuel control valve.

12. The method of claim 11, further comprising correcting the secondary nominal effective flow area versus command data set, including
determining a corrected secondary effective flow area of the secondary fuel control valve relative to where the secondary fuel control valve is positioned based on the secondary flow sensor flow rate and the position of the secondary fuel control valve, and
replacing a secondary effective flow area in the secondary nominal effective flow area versus command data set with the corrected secondary effective flow area.

13. The method of claim 9, further comprising positioning a secondary fuel control valve in a secondary operating position based on a ratio between the flow sensor flow rate and a secondary flow sensor flow rate of the secondary fuel control valve.

14. The method of claim 9, further comprising:
comparing the flow sensor flow rate to a maximum fuel schedule and clamping a fuel demand at the maximum fuel schedule.

* * * * *